(No Model.)
J. C. AYRES.
Leather Horse-Net.
No. 228,019. Patented May 25, 1880.
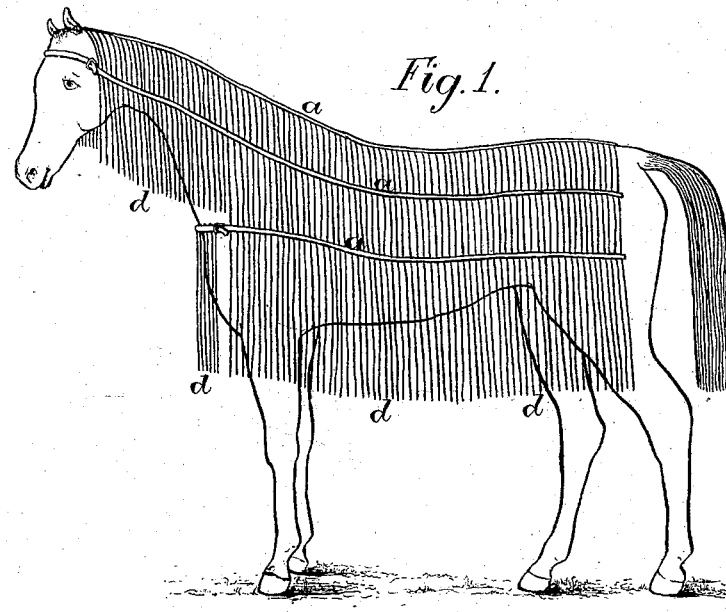
Fig. 1.
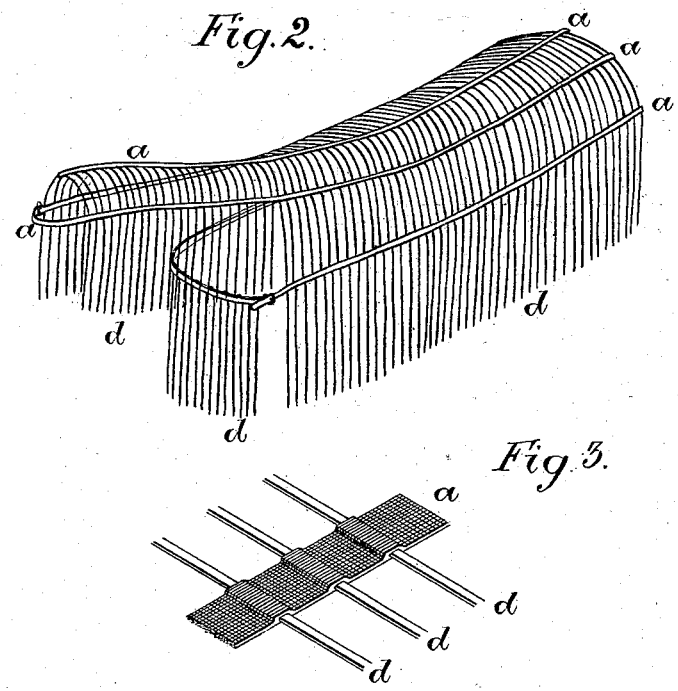
Fig. 2.
Fig. 3.
Witnesses:
Inventor:
John C. Ayres
by his Attorneys
Howson and Son

UNITED STATES PATENT OFFICE.

JOHN C. AYRES, OF PHILADELPHIA, PENNSYLVANIA, ASSIGNOR TO HIMSELF, WILLIAM AYRES, G. RALSTON AYRES, W. MONTGOMERY AYRES, AND LEWIS H. AYRES, OF SAME PLACE.

LEATHER HORSE-NET.

SPECIFICATION forming part of Letters Patent No. 228,019, dated May 25, 1880.

Application filed April 22, 1880. (No model.)

*To all whom it may concern:*

Be it known that I, JOHN C. AYRES, a citizen of the United States, residing in Philadelphia, Pennsylvania, have invented an Improvement in Leather Horse-Nets, of which the following is a specification.

My invention relates to that class of horse-nets in which longitudinal bands are combined with transverse strips for protecting the horse from the attacks of flies; and my invention consists of a cheap and effective net of this class.

In the accompanying drawings, Figure 1 represents a side view of my improved net as it appears when applied to a horse; Fig. 2, a perspective view of the net, showing the shape it assumes when on the horse's back; and Fig. 3, a perspective view, drawn to an enlarged scale, and showing the mode of manufacturing the net.

Horse-nets of this character, for protecting horses against the tantalizing attacks of flies, have usually been made entirely of leather by interlocking with longitudinal bands, such as those shown in the drawings, transverse strips $d$, which, resting on the horse's back, hang down below the flanks, and by their constant agitation, caused by the motions of the horse, prevent the attacks of flies.

Sometimes these nets are made to extend over and down the horse's neck and in front of the breast, as shown in the drawings, and sometimes they are applied to the back and flanks only of the horse.

These leather nets are made by hand, and consequently they are more or less expensive, as much time must be consumed in interlocking the transverse strips of leather with the longitudinal bands.

The transverse strips have sometimes been made of twisted and fibrous threads; but it is necessary to weight these with metal tips in order to prevent the strips from becoming entangled with each other—an objection to which unweighted fibrous threads are subject, particularly when they are wet, but which is effectually obviated by the use of transverse strips of leather.

My improved net consists of transverse strips $d$ of leather combined with longitudinal textile tapes $a$ of cotton or other yarn during the operation of weaving the said tapes. The enlarged perspective view, Fig. 3, shows part of the net, representing a portion of one of the tapes $a$ and portions of three of the transverse strips $d$ of leather. These strips are introduced at proper intervals between warp-threads in the tape-loom, so that in beating up the fabric the strips are united to the tapes. By this mode of constructing the net the longitudinal strips of leather, the most costly parts of an ordinary leather net, are discarded for the cheaper tapes. The main source of economy, however, is the facility with which my improved net can be made without resorting to the manual labor demanded in making ordinary leather nets.

The net shown in the drawings is made to extend over the neck of the horse and in front of the breast; but this particular form of construction need not necessarily be adhered to in all cases.

Without confining myself to any specific number of longitudinal tapes $a$, I claim as my invention and as a new manufacture—

A horse-net composed of longitudinal tapes of textile fabric and transverse strips of leather interwoven with the tapes, all substantially as set forth.

In testimony whereof I have signed my name to this specification in the presence of two subscribing witnesses.

JOHN C. AYRES.

Witnesses:
JAMES F. TOBIN,
HARRY SMITH.